No. 874,540.　　　　　　　　　　　　　　　PATENTED DEC. 24, 1907.
J. H. RAMSDELL.
NUT LOCK.
APPLICATION FILED OCT. 26, 1906.
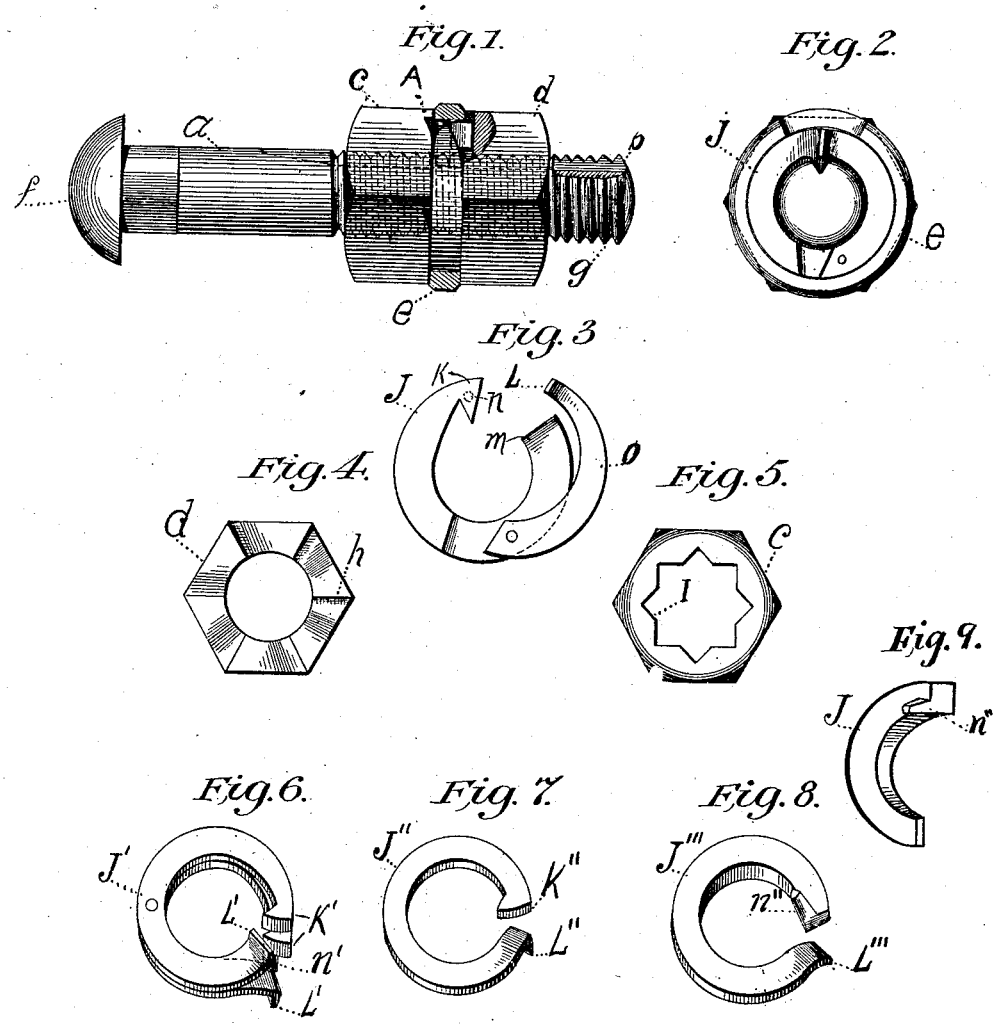
Witnesses.
Theron A. Beard.
Walter J. Beard.
Inventor.
James H. Ramsdell

UNITED STATES PATENT OFFICE.

JAMES HOWELL RAMSDELL, OF NEWTON FALLS, OHIO.

NUT-LOCK.

No. 874,540.     Specification of Letters Patent.     Patented Dec. 24, 1907.

Application filed October 26, 1906. Serial No. 340,788.

*To all whom it may concern:*

Be it known that I, JAMES H. RAMSDELL, of Newton Falls, in the county of Trumbull and State of Ohio, have invented certain new and useful Improvements in Nut-Locks; and I do hereby declare that the following is a full, clear, and exact description of the invention, such as will enable others skilled in the art to which it appertains to make and use the same.

This invention relates to nut locks and has for its object to provide a simple and effective lock, to prevent the nut from turning and loosening on the bolt, and wherein a circular open ring spring washer is employed which is automatically fastened when applied.

With this and other objects in view the invention consists of the combination and arrangement of the several parts which will be more fully hereinafter described and particularly pointed out in the appended claim.

In the drawings, Figure 1 is a side elevation of a bolt with the nut-lock in position thereon, the protector ring and part of the forward nut being cut away to show the parts more fully. Fig. 2 is an end view of the same, the upper nut being shown in dotted lines. Fig. 3 is a plan view of the open spring washer. Fig. 4 is a bottom view of the upper nut. Fig. 5 is a lower face view of the lower nut. Figs. 6, 7, 8 and 9 are perspective views of modified forms of locking washers.

Corresponding parts in the several figures are denoted by like reference characters.

Referring to the drawings, $a$ designates an ordinary threaded bolt provided with a longitudinally disposed slot $b$ in the threads $g$ thereof and having two nuts $c$ and $d$ screwed thereon between which is a double spring washer J surrounded by a protector ring $e$. The bolt is provided with a rounded head $f$. The spring washer is bent in an approximately circular body of a size sufficient to easily slip over the bolt threads. On one extremity K of this washer is disposed a lug $n$ at right angles to the plane of the washer; the end is also so formed that the inner toothed portion will engage in the groove $b$ of the bolt when the washer is in place. The circular body portion of the washer is cut away about one-half of its thickness at a point beginning near the center of the washer and extending to the end opposite the lug $n$. This end is also bent so as to form a tooth $m$. In the cut away portion of the washer is pivotally mounted an arm O the end of which is bent to form a tooth L extending outward from the plane of the washer. The arm is kept from swinging outwardly by means of the protector ring $e$ which is placed over the washer when in locking position. The lower nut $c$ is provided on its upper face with a ratchet face A adapted to coöperate with the ratchet tongue on the body of the washer J. The nut is also provided with notches I on the inner threaded surface. The upper nut is provided on its lower face with ratchet teeth $h$.

The operation of the nut lock is as follows: Nut $c$ is first screwed on the bolt to the desired position and with one of the notches I on the inner surface in register with the slot $b$ and notch I. When in this position the tooth $m$ engages in a notch of the ratchet face A on the top of the nut $c$. The protector ring is now placed over the spring washer to hold the arm O in place and prevent dirt from becoming lodged in the split portion of the washer. This ring also protects the spring washer from excessive pressure when nut $d$ is screwed in place. When all the parts are thus in place it is seen that the lower nut $c$ is locked both by the lug $n$ and ratchet tooth $m$ while the upper nut is locked by the ratchet tooth L on arm O.

The modified form of washer J' shown in Fig. 6 is split its entire length and secured together at the central parts by a rivet. The section which is adapted to coöperate with the lower nut has a lug $n'$ and tooth K' on one end for engaging in the bolt slot and a ratchet tooth L' on the other end for engaging with the ratchet face of nut $c$. The upper section is provided with a ratchet tooth K'' for engaging with the bolt groove $b$ and on the opposite end with a spring tooth L' for engaging with the ratchet face of the nut $d$.

Fig. 7 shows a form of a washer J'' with but one groove engaging and one nut engaging tooth K'' and L'' respectively. In using this form of washer the upper nut may be of the ordinary form.

Fig. 8 shows a washer J''' with a lug $n''$ for engaging the groove $b$ and notch I and a tooth L''' for engaging the ratchet face of the upper nut.

Fig. 9 is of the same form as that shown in Fig. 8 with the exception that the washer is shorter.

What I claim is:

1. In a nut lock the combination of a longitudinally slotted bolt, a plurality of nuts thereon, the adjacent faces thereof having ratchet teeth, the lower nut being also provided with notches in its threaded bore adapted to register with the bolt slot, a spring washer located between the nuts and having a tooth engaging in the bolt slot and a spring tooth adapted to engage the ratchet teeth of one of the nuts.

2. In a nut lock the combination of a longitudinally slotted bolt, a plurality of nuts thereon the adjacent faces thereof having ratchet teeth, the lower nut being also provided with notches in its threaded bore adapted to register with the bolt slot, a spring washer located between the nuts and having a lug engaging in the bolt slot and registering lower nut notch and spring teeth adapted to engage the ratchet teeth on each nut one of the spring teeth being pivoted on the washer and held in position by a protector ring surrounding the washer.

I affix my signature in the presence of two witnesses.

JAMES HOWELL RAMSDELL.

Witnesses:
S. L. RAMSDELL,
H. J. RAMSDELL.